US008756992B2

(12) United States Patent  
Bogdanchik

(10) Patent No.: US 8,756,992 B2  
(45) Date of Patent: Jun. 24, 2014

(54) LEVEL DETECTOR FOR MEASURING FOAM AND AERATED SLURRY LEVEL IN A WET FLUE GAS DESULFURIZATION ABSORBER TOWER

(75) Inventor: Peter J. Bogdanchik, Knoxville, TN (US)

(73) Assignee: ALSTOM Technology Ltd, Baden (CH)

(*) Notice: Subject to any disclaimer, the term of this patent is extended or adjusted under 35 U.S.C. 154(b) by 285 days.

(21) Appl. No.: 13/232,249

(22) Filed: Sep. 14, 2011

(65) Prior Publication Data

US 2013/0061669 A1     Mar. 14, 2013

(51) Int. Cl.  
*G01F 23/00* (2006.01)

(52) U.S. Cl.  
USPC .................................................. 73/290 R

(58) Field of Classification Search  
USPC ................. 73/290 R, 290 V, 290 B  
See application file for complete search history.

(56) References Cited

U.S. PATENT DOCUMENTS

| | | | |
|---|---|---|---|
| 2,329,412 A * | 9/1943 | Hollis | 73/290 R |
| 3,367,183 A * | 2/1968 | Webster | 73/304 C |
| 3,993,947 A | 11/1976 | Maltby et al. | |
| 4,146,834 A | 3/1979 | Maltby et al. | |
| 4,208,909 A | 6/1980 | Maltby et al. | |
| 4,232,300 A * | 11/1980 | Wright et al. | 340/870.39 |
| 4,350,040 A | 9/1982 | Fasching et al. | |
| 4,363,030 A | 12/1982 | Maltby et al. | |
| 4,499,641 A | 2/1985 | Fleckenstein | |
| 4,499,767 A | 2/1985 | Fathauer et al. | |
| 4,589,281 A | 5/1986 | Aldrich | |
| 4,723,122 A | 2/1988 | Maltby et al. | |
| 4,762,000 A * | 8/1988 | Bond, Jr. | 73/290 R |
| 4,849,754 A | 7/1989 | Maltby et al. | |

(Continued)

FOREIGN PATENT DOCUMENTS

| | | |
|---|---|---|
| EP | 1 541 976 | 6/2005 |
| JP | 59-168322 | 9/1984 |
| JP | 2005-233809 | 9/2005 |

OTHER PUBLICATIONS

Rosemount Inc., Successful Measurement of Black Liquor and Soap Levels, 2006.

(Continued)

*Primary Examiner* — Daniel S Larkin  
*Assistant Examiner* — Jamar Ray  
(74) *Attorney, Agent, or Firm* — Rita D. Vacca

(57) ABSTRACT

A level detector 100 includes a sleeve 210 mountable to a vessel and extendable through a wall 212 defined by the vessel 212A and into an interior area 214 defined by the vessel. The sleeve 210 is mountable at an angle A of less than forty-five degrees relative to the vessel wall 212. The level detector 100 includes a level sensing probe 230 extending into a bore defined by an inside surface 218 of the sleeve 210. The level sensing probe 230 is configured to measure a plurality of foam and aerated slurry levels in the vessel 212A. One or more connectors 232, 244 are positioned outside 212B of the vessel 212A to removably support the level sensing probe 230 within the bore. The level sensing probe 230 is in communication with the interior area 214 via one or more openings 254, 258 extending into the bore.

19 Claims, 7 Drawing Sheets

(56) References Cited

U.S. PATENT DOCUMENTS

| | | | |
|---|---|---|---|
| 4,869,846 A | 9/1989 | Mouche et al. | |
| 4,902,962 A | 2/1990 | Ishikawa | |
| 4,914,377 A | 4/1990 | Russell | |
| 5,532,527 A | 7/1996 | Zatler et al. | |
| 5,600,997 A | 2/1997 | Kemp et al. | |
| 5,780,306 A | 7/1998 | Schels et al. | |
| 5,832,772 A | 11/1998 | McEwan | |
| 5,929,754 A | 7/1999 | Park et al. | |
| 5,973,415 A | 10/1999 | Brenner et al. | |
| 6,198,424 B1 | 3/2001 | Diede et al. | |
| 6,477,474 B2* | 11/2002 | Diede | 702/57 |
| 6,516,661 B1 | 2/2003 | Spillman, Jr. et al. | |
| 6,521,112 B1 | 2/2003 | Balisky | |
| 6,782,736 B1 | 8/2004 | Hammer | |
| 6,935,173 B2 | 8/2005 | Stehman et al. | |
| 7,114,391 B2 | 10/2006 | Sasaki et al. | |
| 7,345,622 B2 | 3/2008 | Edvardsson | |
| 7,509,856 B1 | 3/2009 | Winkens et al. | |
| 7,921,695 B2* | 4/2011 | Larocque | 73/61.44 |
| 2004/0108951 A1* | 6/2004 | Edvardsson | 342/124 |

OTHER PUBLICATIONS

Forums.MrPLC.com, Sensing Foam?, Sep. 2008.
Notice of Preliminary Rejection from the Korean Patent Office for Application 10-2012-0102254 mailed Sep. 27, 2013.
Notification of Reasons for Refusal from the Japanese Patent Office dispatched Feb. 3, 2014 for JP2012-203153.
European Search Report dated Feb. 21, 2014 for EP12184595.2.
"Inclined Installation with Guided Wave Radar Enables Hexane Level Measurement", Retrieved from the Internet on Feb. 5, 2014 at http://www2.emersonprocess.com/siteadmincenter/PM%20Rosemount%20Documents/00830-1000-4811.pdf, Rosemount, Inc. 2006.
"Rosemount 3300 Series Guided Wave Radar Level and Interface Transmitters", Retrieved from the Internet on Feb. 5, 2014 at http://www2.emersonprocess.com/siteadmincenter/PM%20Rosemount%20Documents/00809-0100-4811, Rosemount 2006.
"Technical Information Levelflex M FMP41C, FMP45", Retrieved from the Internet on Feb. 5, 2014 at http://www.is-com.ru/files/FMP41C1, Endress+Hauser, 2009.

* cited by examiner

LEVEL DETECTOR FOR MEASURING FOAM AND AERATED SLURRY LEVEL IN A WET FLUE GAS DESULFURIZATION ABSORBER TOWER

FIELD OF THE INVENTION

The present invention is generally directed to a level detector and is more specifically directed to a level sensor assembly for detecting foam and aerated slurry level, in conjunction with a liquid level detector in a wet flue gas desulfurization absorber tower. The detector will measure foam and/or aerated slurry level.

BACKGROUND OF THE INVENTION

Some fossil fueled power plants combust coal for the production of steam and electricity. Coal contains sulfur. As a result of the combustion of the coal, a portion of the sulfur reacts with oxygen and forms sulfur dioxide ($SO_2$), which is present in flue gas generated by the combustion. Sulfur dioxide is a known pollutant. Accordingly, several countries have established environmental regulations to limit the amount of sulfur dioxide in flue gas. One method of reducing or eliminating sulfur dioxide in flue gas is to treat the flue gas in a desulfurization absorber tower. The flue gas can react with a slurry of wet limestone ($CaCO_3$) in the absorber tower to form calcium sulfite ($CaSO_3$) and calcium sulfate ($CaSO_4$).

The absorber towers are typically 50-60 foot diameter pressure vessels accommodating limestone/gypsum slurry levels of 40 feet or more. The absorber towers generally define an inlet duct for introducing the flue gas into the absorber tower and an outlet duct for discharging treated gases. In some instances, an induced draft fan is positioned just ahead of the absorber tower in the inlet duct. Automatic controls are used to maintain predetermined slurry levels in the absorber tower.

Chemical reactions between the flue gas, the slurry and other chemicals in the absorber tower and air, which is injected into the slurry at the bottom of the absorber tower, can produce foam and aerated slurry floating on the slurry. If undetected, the foam and/or aerated slurry can accumulate and overflow into the inlet duct and damage the induced draft fan.

SUMMARY OF THE INVENTION

According to aspects disclosed herein, there is provided a level detector, which includes a sleeve mountable through a wall defined by a vessel and into an interior area of the vessel. The sleeve is mountable at an angle of less than forty-five degrees relative to the vessel wall. The level detector includes a level sensing probe extending into a bore defined by the sleeve. The level sensing probe is configured to measure a plurality of foam and/or aerated slurry levels in the vessel. One or more connectors are positioned outside of the vessel to removably support the level sensing probe within the bore. The level sensing probe is in communication with the interior area via one or more openings extending into the bore.

In one embodiment, one or more of the connectors (e.g., a flanged connector or a threaded coupling) and the level sensing probe are operable to enable the level sensing probe to be installed and removed from the sleeve from a position external to the vessel without requiring access to the interior area.

In one embodiment, the level sensing probe defines a stiffness such that the probe is maintained in a position spaced away from an inside surface of the sleeve. In addition, a spacer can be positioned in the sleeve between the level sensing probe and the inside wall of the sleeve.

The level detector can include a liquid level sensor and a comparator module (e.g., a programmable logic controller). In one embodiment, the comparator module is in communication with the liquid level sensor and the level sensing probe. In addition, the comparator module includes an algorithm which generates a foam and aerated slurry level measurement by subtracting a liquid level measurement generated by the liquid level sensor, from the level measurement generated by the level sensing probe.

The level sensing probe can be a radio frequency (RF) admittance probe, a guided wave radar probe or other probe such as those that can be installed in a configuration spaced apart from the sleeve.

A method for measuring foam and aerated slurry in a vessel is also disclosed herein. The method includes providing a sleeve mountable to the vessel and extendable through a wall defined by the vessel into an interior area of the vessel. The sleeve is mountable at an angle of less than forty-five degrees relative the vessel wall. A level sensing probe is provided which is installable into a bore defined by an inside surface of the sleeve. A liquid level sensor is also provided which is mountable to the vessel and extendable through the wall into the interior area of the vessel. A comparator module in communication with the liquid level sensor and the level sensing probe is also provided. The comparator module generates a foam and aerated slurry level measurement by subtracting a liquid level measurement generated by the liquid level sensor, from another level measurement generated by the level sensing probe.

DESCRIPTION OF THE DRAWINGS

Referring now to the Figures, which are exemplary embodiments, and wherein the like elements are numbered alike.

DETAILED DESCRIPTION OF THE PREFERRED EMBODIMENT

Figure 1:
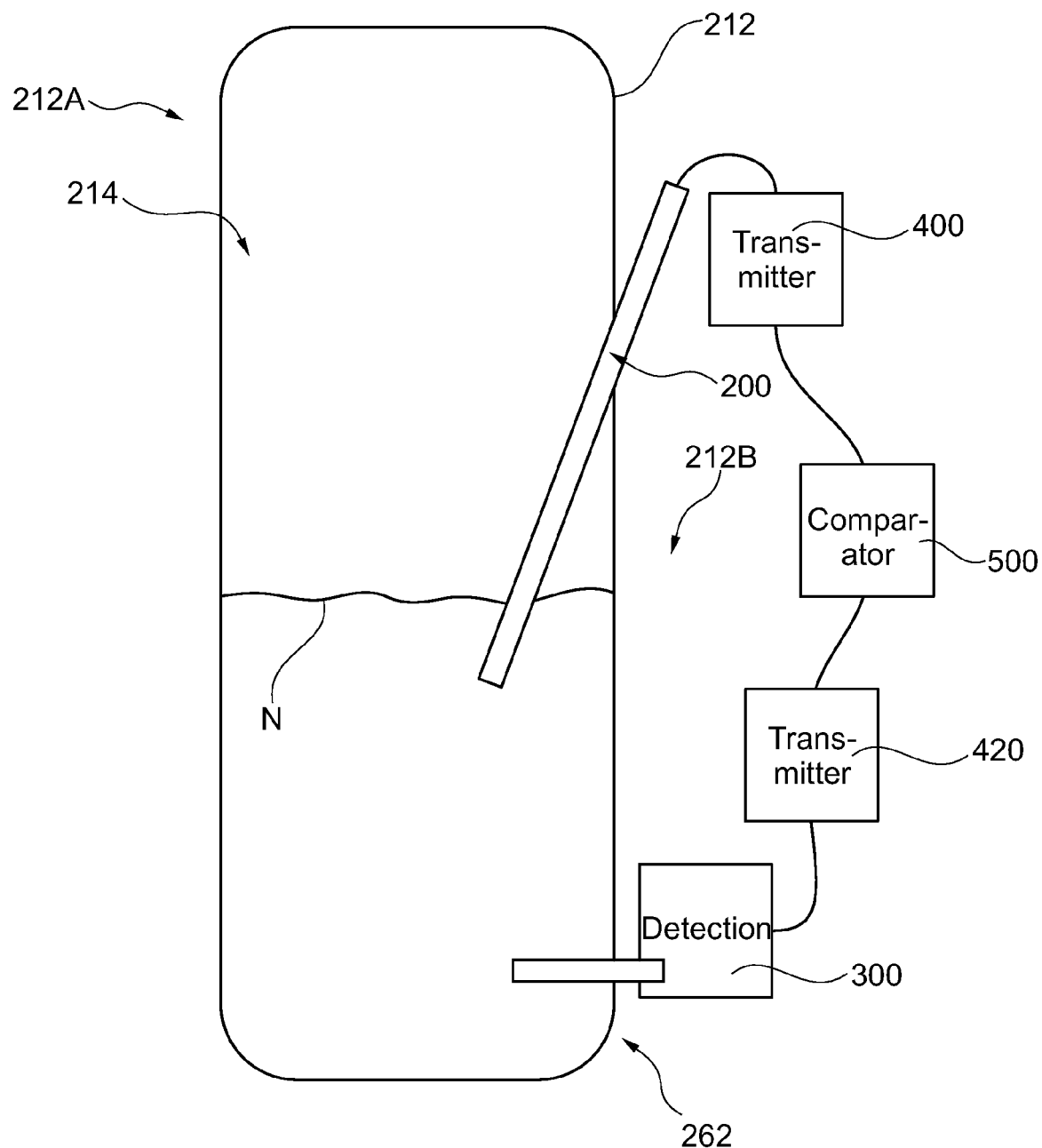
FIG. 1 is a schematic side cross sectional view of a vessel having a foam detection assembly installed therein.
Figure 2:
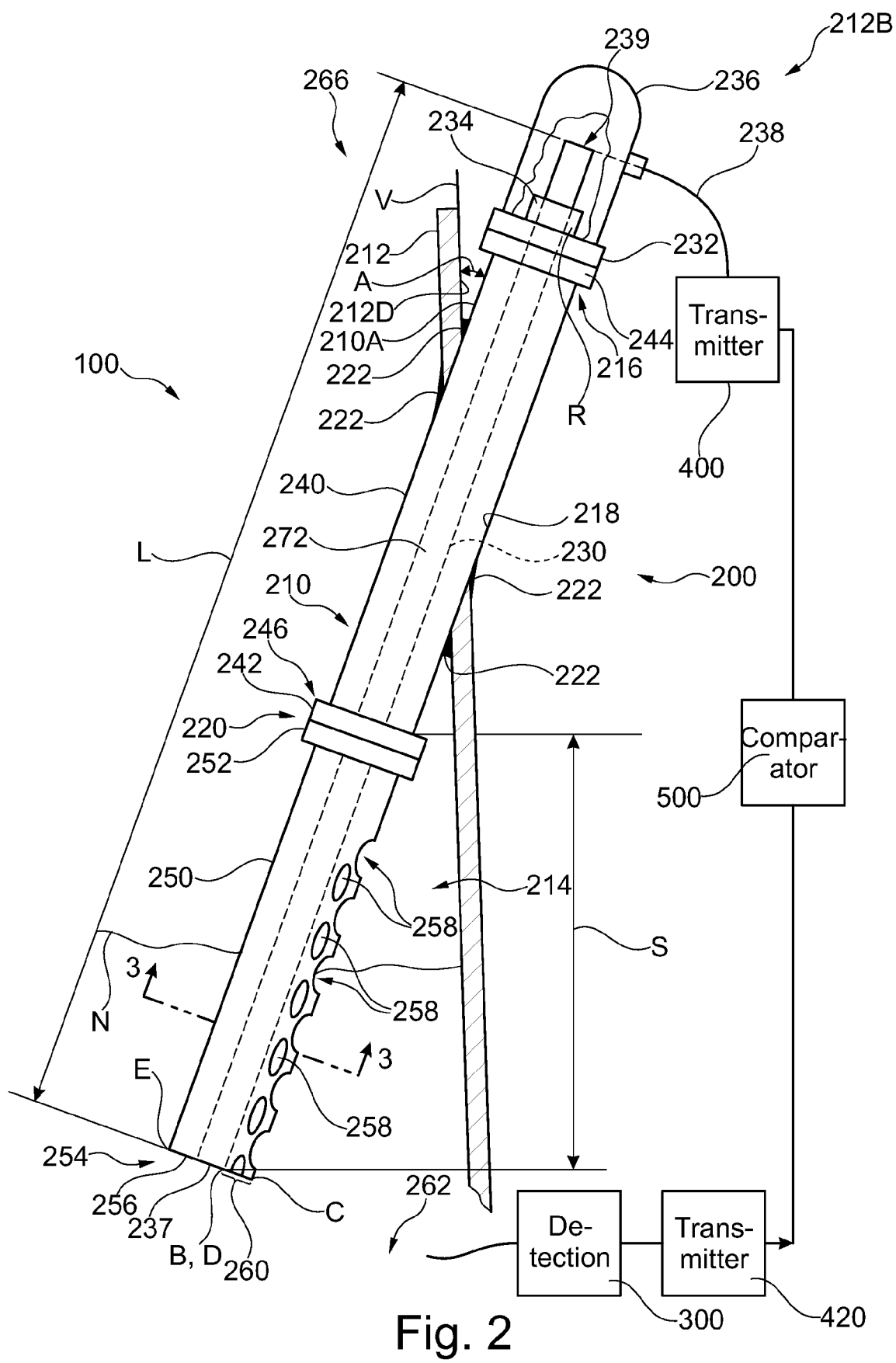
FIG. 2 is a side cross sectional view of a vessel section having a foam detection assembly of FIG. 1 installed therein.

Disclosed herein is a level detector for measuring the level of foam in a vessel, for example, in an absorber tower of a wet flue gas desulfurization system. Referring to FIGS. 1 and 2, the level detector is generally designated by the numeral 100. The level detector 100 includes a foam/aerated slurry detection assembly 200 in communication with a first transmitter 400 and a liquid detection assembly 300 in communication with a second transmitter 420. The first 400 and second 420 transmitters are in communication with a comparator module 500, for example a programmable logic controller, a computer program and/or a controller, for comparing and calculating vessel foam and aerated slurry level, as described in more detail below. The foam/aerated slurry detection assembly 200 measures a combined level of foam, aerated slurry and liquid level in the vessel 212A. The liquid detection assembly 300 is positioned in a portion of the vessel 212A, below a normal liquid level N (e.g., a bottom 262 portion of the vessel) and can include, for example, a differential pressure sensor or other suitable sensor that measures liquid level. The comparator module 500 includes an algorithm operable to subtract liquid level from the combined level (i.e., of foam, aerated slurry and liquid level) to arrive at the foam and aerated slurry level in the vessel 212A. The comparator module 500 is in communication with a display and a control module. A screen portion of the display exhibits indicia representative of the level of foam in the vessel 212A, such as in the form of a numerical value, chart, graph or the like, which communicates the level of foam and aerated slurry in the vessel 212A. The control module receives combined foam and aerated slurry level signals from the comparator module 500 and transforms the combined foam and aerated slurry level signals into control signals for controlling equipment, such as anti-foaming agents and level control valves in the wet flue gas desulfurization system.

As illustrated in FIGS. 1 and 2, the foam/aerated slurry detection assembly 200 includes a sleeve 210, for example a pipe, extending through a wall 212 (e.g., a vertical wall) of a vessel 212A and into an interior area 214 of the vessel 212A. The sleeve 210 is mountable with its uppermost surface 210A at an angle A of about fifteen degrees relative to a reference line V, i.e., the exterior surface 212D of wall 212. The foam/aerated slurry detection assembly 200 includes a level sensing probe 230, such as but not limited to a radio frequency (RF) admittance probe and a guided wave radar probe, removably secured to an end 216 of the sleeve 210, located external 212B to the vessel 212A. A distal end 256 of the sleeve 210 defines an opening 254 so that the level sensing probe 230 can communicate with the interior area 214, as described below. In one embodiment, the sleeve 210 and the level sensing probe 230 extend from the wall 212 in a generally downward direction towards a bottom 262 of the vessel 212A. While the level sensing probe 230 is described as being a RF admittance probe or a guided wave radar probe, other level sensing probes may be employed including but not limited to those that can be installed in a configuration spaced apart from the sleeve 210.

A first connector 232, such as but not limited to a flanged joint, a threaded coupling and a bayonet fitting, is secured to the level sensing probe 230 by a locking member 234 (e.g., a threaded coupling or a compression fitting). The first connector 232 is removably secured to the sleeve 210 by a second connector 244 (e.g., a flanged joint, a threaded coupling or a bayonet fitting) mounted on the sleeve 210. The first and second connectors 232 and 244, respectively, are located outside 212B the vessel 212A and cooperate with one another to position the level sensing probe 230 inside a bore defined by an inside wall 218 of the sleeve 210. The level sensing probe 230 defines a stiffness such that the level sensing probe is maintained spaced away from the inside wall 218, for example, positioned substantially concentric within the sleeve 210. Thus the level sensing probe 230 is mountable and operable at an angle of about fifteen degrees from the reference line V, e.g., the vertical wall 212. The level sensing probe 230 is supported in a cantilever configuration, from the locking member 234 at point R to a free end 237 of the level sensing probe 230, by the first and second connectors 232 and 244. Thus portions of the level sensing probe 230 disposed within interior area 214 of the vessel 212A have no support members secured thereto. Another end 239 of the level sensing probe 230 is contained within a housing 236 and is in communication with the first transmitter 400 via a suitable transmission device 238 (e.g., wiring and/or wireless transmission) The first transmitter 400 is in communication with the comparator module 500. While the sleeve 210 and level sensing probe 230 is shown and described as being mountable at an angle A of fifteen degrees relative to the reference line V, other angles may also be employed, for example sleeves 210 being mountable at an angle less that 45 degrees or at an angle between about 14 and 16 degrees, relative to the reference line V, can also be employed without departing from the broader aspects disclosed herein.

Mounting the sleeve 210 and the level sensing probe 230 at an angle of about 15 degrees, 14 to 16 degrees or less than 45 degrees from the reference line V, e.g., the vessel 212A wall 212 places the probe 230 away from a central portion of the vessel 212A where the slurry may be traveling at a higher velocity than the velocity in an area adjacent to the wall. Slurry traveling at such a high velocity could lead to probe 230 damage resulting in erroneous level measurements. In addition, as the angle A is increased beyond 45 degrees, the level sensing probe 230 tends to bend and become non-concentric within the sleeve 210, thereby causing inaccurate level measurements.

As illustrated in FIG. 2, the sleeve 210 includes a mounting portion 240 and a measuring portion 250, removably secured to one another by a connector 220, for example, a pair of flanges 242 and 252, a threaded coupling or a bayonet fitting. The mounting portion 240 is mountable to the wall 212, for example by a welded joint 222. An end 246 of the mounting portion 240 and the measuring portion 250 are positioned in the interior area 214 of the vessel 212A and are also positioned at an angle A of about fifteen, 14 to 16 degrees or less than 45 degrees from reference line V, e.g., the vertical wall 212. The mounting portion 240 is manufactured from a metal or alloy comparable to that of the vessel 212A.

Figure 3:
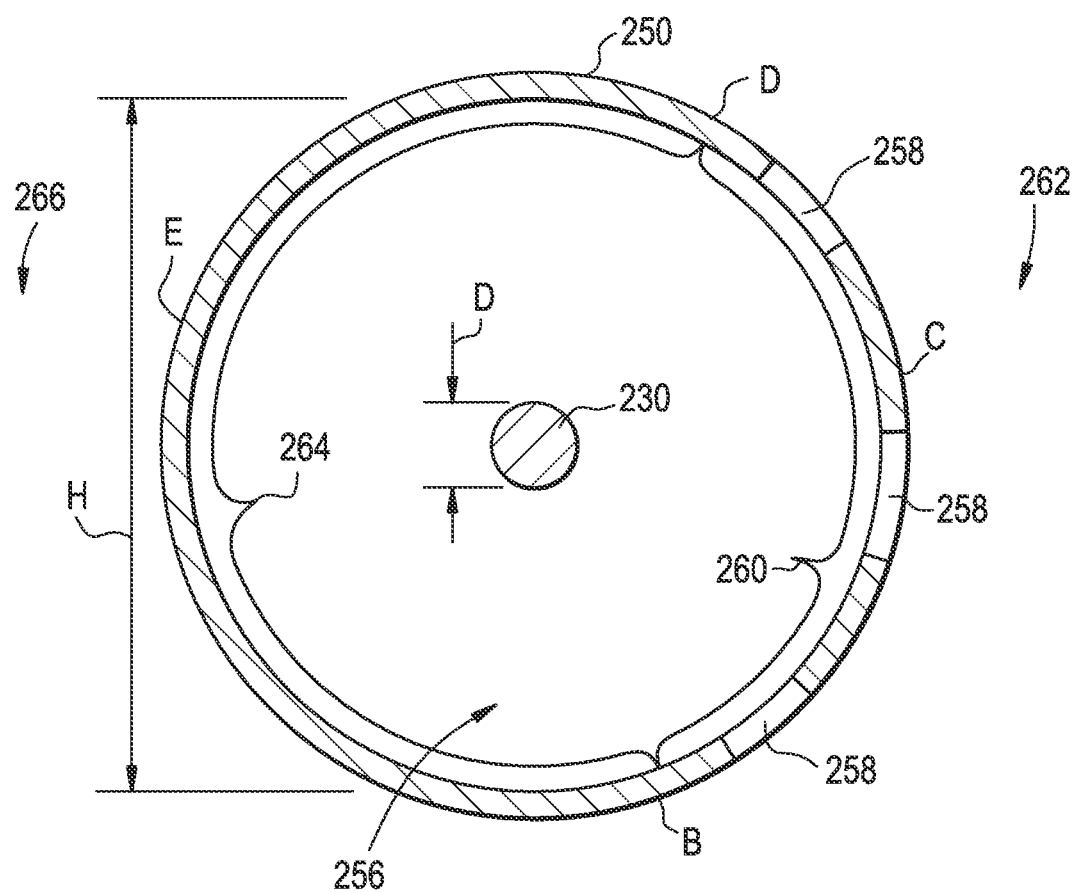
FIG. 3 is a top cross sectional view of a portion of the foam detection assembly of FIG. 2 taken along line 3-3.

The measuring portion 250 is manufactured from a material that can withstand corrosive attributes of the slurry, aerated slurry and foam. In one embodiment, the measuring portion 250 is a piece of pipe such as, but not limited to fiberglass reinforced pipe, plastic pipe or stainless steel pipe. Plastic and fiber reinforced pipe can be used to reduce costs and simplify manufacturing and assembly. The measuring portion 250 has an opening 254 at the distal end 256 thereof. The measuring portion 250 also includes a plurality of passages 258 extending therethrough. As illustrated in FIGS. 2 and 3, the passages 258 are positioned on a first section 260 of the measuring portion 250 toward the bottom 262 of the vessel 212A, for example in section BCD which defines an arc of less than 180 degrees through points B, C and D. The opening 254 and the passages 258 allow slurry, aerated slurry and foam to enter the measuring portion 250 and to communicate with the level sensing probe 230. A second section 264 of the measuring portion 250 toward top 266 of the vessel 212A, for example, section BED, is substantially solid and has no passages extending therethrough. Therefore, the second section 264 protects the level sensing probe 230 from being impinged by downwardly falling slurry circulating in the vessel 212A.

In one embodiment, the level sensing probe 230 includes a probe rod 272, for example a solid cylindrical shaft manufactured of a material compatible with the slurry, aerated slurry and foam, such as, but not limited to carbon steel. In one embodiment, the probe rod 272 has an outside diameter D of about 0.84 inches, including a corrosion resistant coating or insulating material, which can be disposed thereon. The coating or insulating material also minimizes build up of slurry, aerated slurry and foam on the probe rod 272. The probe rod 272 is about 7 to 20 feet in length L. In one embodiment, the probe rod 272 is coated with a corrosion resistant insulating material such as, but not limited to a thermoplastic fluoropolymer resin (e.g., Kynar®), polyvinylidene fluoride (PVDF) and/or polytetrafluoroethylene (PTFE). In one embodiment, the sleeve 210 has an inside diameter of about 3.5 to about 4.5 inches. While the probe rod 272 is described as being a coated solid cylindrical shaft of about 0.84 inches in diameter and 7 to 20 feet in length, other sizes and cross sectional shapes may be employed, including but not limited to rectangular, triangular and/or oval cross sections and rods of any diameter and length.

Figure 4:
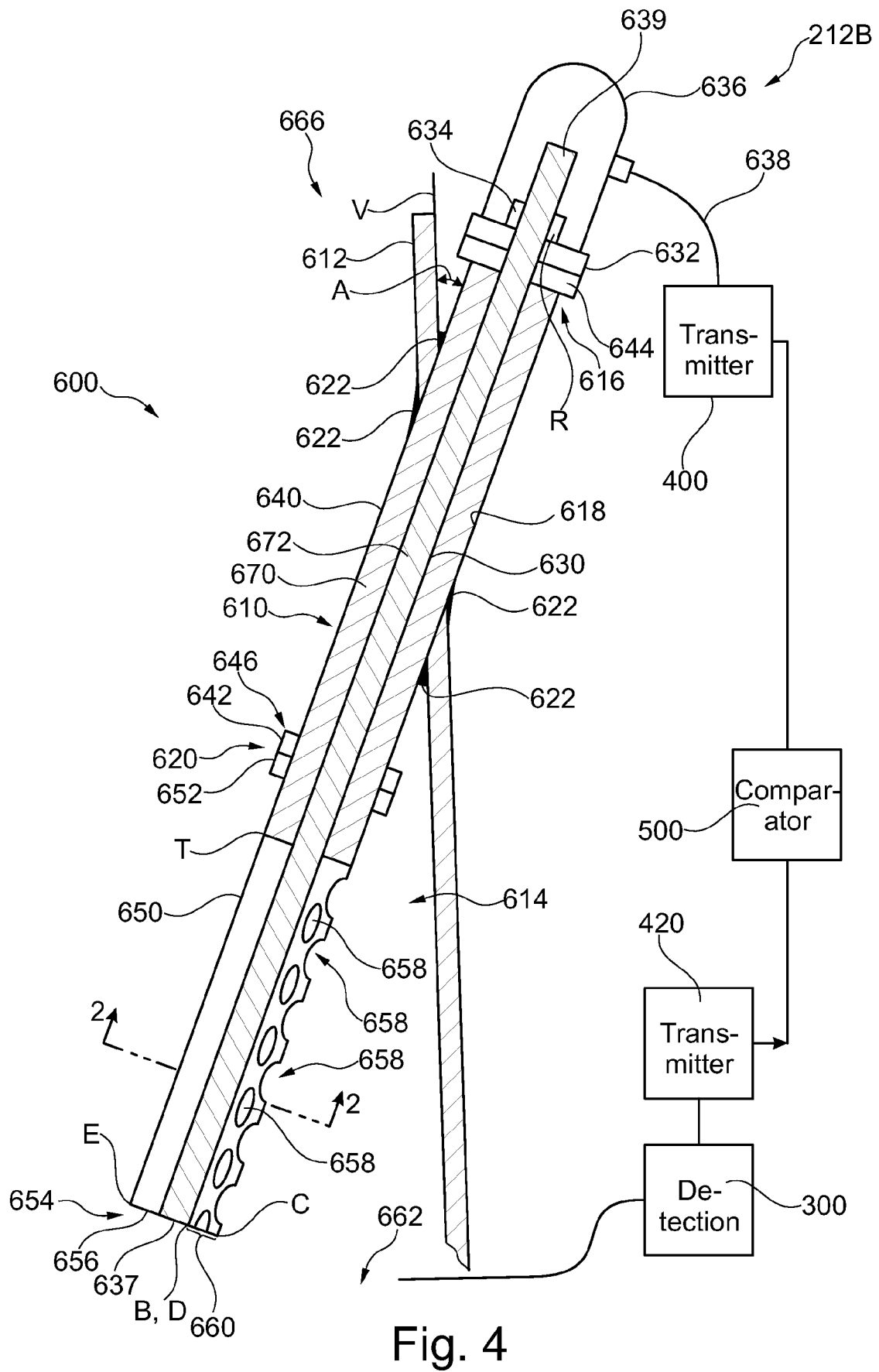
FIG. 4 is a side cross sectional view of a vessel section having another embodiment of the foam detection assembly of FIG. 2.
Figure 5:
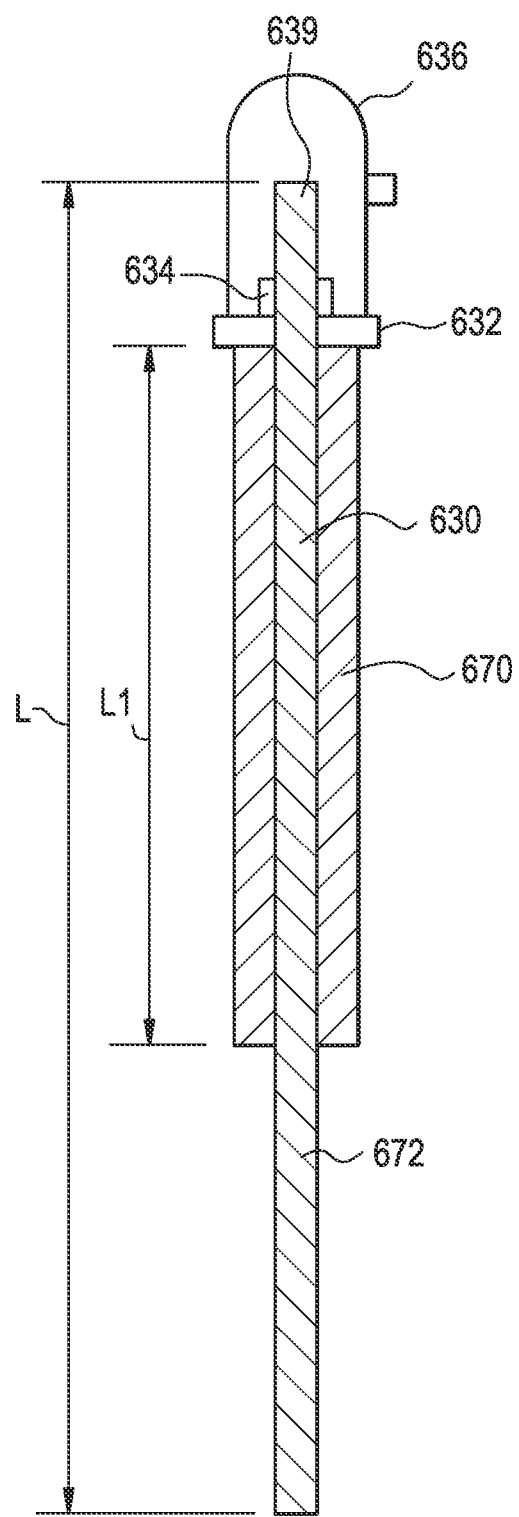
FIG. 5 is a side cross sectional view of the level sensing probe of FIG. 4, shown removed from the foam detection assembly.

The foam/aerated slurry detection assembly of FIGS. 4 and 5 is similar to the foam/aerated slurry detection assembly 200 illustrated in FIGS. 1, 2 and 3. Accordingly, like elements have been assigned like element numbers with the first digit 2 being replaced by the number 6. The level sensing probe 630 includes an annular spacer 670 operable to support the level sensing probe 630. The spacer 670 extends through substantially all of the mounting portion 640 and into a portion of the measuring portion 650. In one embodiment, the spacer 670 extends to a point T about 4 inches into the measuring portion, measured from the flange 652. The spacer 670 can be manufactured from a material such as, but not limited to a synthetic fluoropolymer of tetrafluoroethylene or polytetrafluoroethylene (PTFE) (e.g., Teflon®) and is secured to the level sensing probe 630. The spacer 670 minimizes build up of slurry in the mounting portion 640. The level sensing probe 630 is supported in a cantilever configuration, from the point T to a free end 637 of the level sensing probe 630, by the first and second connectors 632 and 644, the mounting portion 640, a portion of the measuring portion 650 and the spacer 670. Thus portions of the level sensing probe 630 from the point T to the free end 637 have no support members secured thereto.

Figure 6:
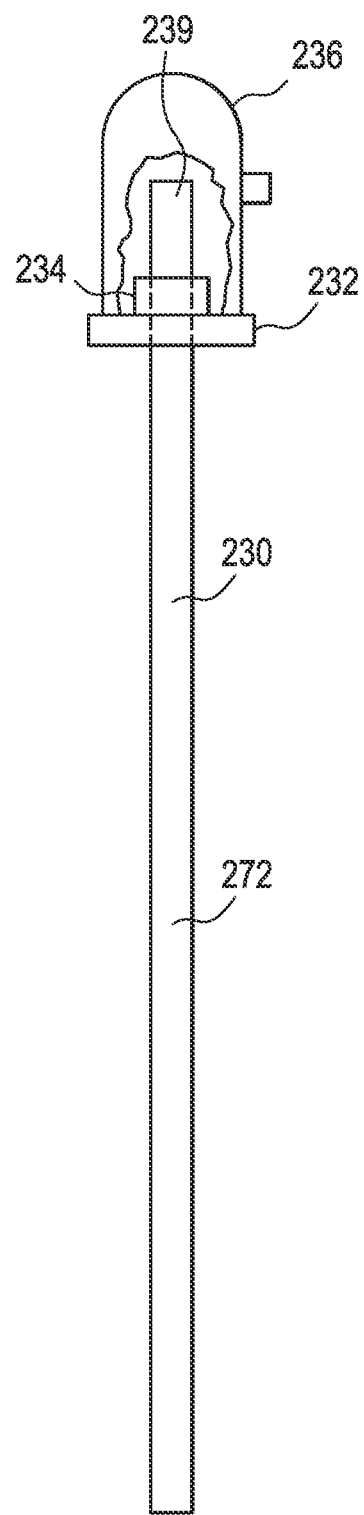
FIG. 6 is a side view of a level sensor of FIG. 2, shown removed from the foam detection assembly.
Figure 7:
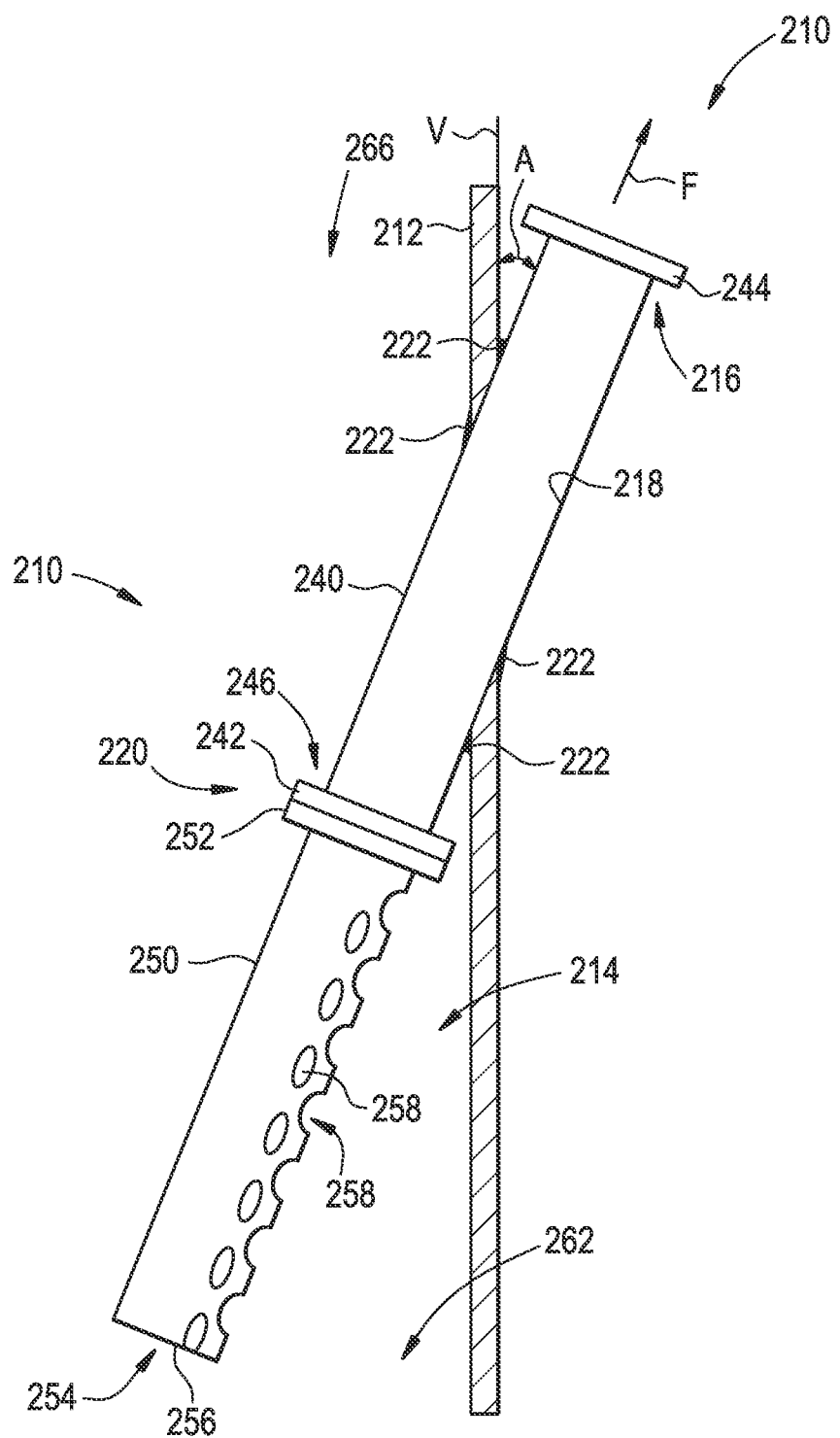
FIG. 7 is a side view of a sleeve for the foam detection assembly of FIG. 2 shown with the level sensor removed from the foam detection assembly.

As illustrated in FIGS. 6 and 7, the level sensing probe 230 can be removed from the sleeve 210 by disengaging the first and second connectors 232 and 244, respectively, from one another and withdrawing the level sensing probe 230 in the general direction indicated by the arrow F. Thus the level sensing probe 230 can be installed and removed from the sleeve 210 from a position external 212B to the vessel 212A and without requiring access to the interior area 214.

During operation, the foam/aerated slurry detection assembly 200 measures a plurality of foam, aerated slurry and/or slurry levels in the vessel 212A of the wet flue gas desulfurization system at temperatures of about 135° F. to about 145° F. The foam/aerated slurry detection assembly 200 has a level detection range S, for example, a level detection range S of about 4 to 6 feet. The level sensing probe 230 is positioned in the vessel 212A such that a normal slurry level N is within the detection range S. In one embodiment, the level sensing probe 230 is an RF admittance probe which employs radio frequency waves and measures capacitance and resistance of a dielectric material, such as the foam and the slurry, located between the probe and the wall 212 of the vessel 212A. In one embodiment, the level sensing probe 230 is a guided wave radar probe. The level sensing probe 230 includes suitable electronics to generate a first level signal for transmission to the comparator module 500. In addition, the liquid detection assembly 300 generates a liquid level signal for transmission to the second transmitter and subsequently to the comparator module 500. The comparator module 500 includes an algorithm that is configured to subtract the liquid level signal from the first level signal to arrive at the foam and aerated slurry level measurement. The foam and aerated slurry level can be shown on the display and/or used by the control module for controlling equipment, such as anti-foaming agents and level control valve in the wet flue gas desulfurization system.

A method for measuring foam and aerated slurry in a vessel is also disclosed herein. The method includes providing a sleeve mountable to the vessel and extendable through a wall defined by the vessel into an interior area of the vessel. The sleeve is mountable at an angle of less than forty-five degrees relative the vessel wall. A level sensing probe is provided which is installable into a bore defined by an inside surface of the sleeve. A liquid level sensor is also provided which is mountable to the vessel and extendable through the wall into the interior area of the vessel. A comparator module in communication with the liquid level sensor and the level sensing probe is also provided. The comparator module generates a foam and aerated slurry level measurement by subtracting a liquid level measurement generated by the liquid level sensor, from another level measurement generated by the level sensing probe.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A foam and aerated slurry level detector comprising:
   a sleeve mountable to a vessel and extendable through a wall defined by the vessel into an interior area defined by the vessel, the sleeve being mountable at an angle of less than forty-five degrees relative to the wall defined by the vessel;
   a level sensing probe configured to measure a plurality of foam and aerated slurry levels in the vessel, to extend into a bore defined by an inside surface of the sleeve, and to communicate with the interior area via at least one opening in the sleeve which extends into the bore;
   at least one connector positioned outside of the vessel and configured to removably support the level sensing probe within the bore;
   a liquid level sensor mounted to the vessel and extended through the wall into the interior area of the vessel to measure liquid level; and
   a comparator module in communication with the liquid level sensor and the level sensing probe to determine a foam and aerated slurry level by subtracting a liquid level measured generated by the liquid level sensor, from another level measurement generated by the level sensing probe.

2. The level detector of claim 1, wherein the at least one connector and the level sensing probe are operable to enable the level sensing probe to be installed and removed from the sleeve from a position external to the vessel without requiring access to the interior area.

3. The level detector of claim 1, wherein the level sensing probe defines a stiffness such that the level sensing probe is spaced away from the inside surface of the sleeve.

4. The level detector of claim 1, wherein the level sensing probe is configured to operate in a wet flue gas desulfurization absorber tower at a temperature of about 135 to about 145 degrees Fahrenheit.

5. The level detector of claim 1, wherein the level sensing probe is about 7 to 20 feet in length.

6. The level detector of claim 1, wherein the level sensing probe includes a corrosion resistant coating disposed thereon.

7. The level detector of claim 1, wherein the level sensing probe is a radio frequency admittance probe.

8. The level detector of claim 7, wherein the radio frequency admittance probe is configured to employ a radio frequency signal and is configured to measure capacitance and resistance of material disposed between the radio frequency admittance probe and the wall.

9. The level detector of claim 1, wherein the at least one connector comprises a first flange secured to the sleeve and a second flange secured to the level sensing probe and wherein the first and second flanges are removably connected to one another.

10. The level detector of claim 1, wherein the sleeve is mountable at an angle of about 14 degrees to about 16 degrees, relative to the vessel wall.

11. The level detector of claim 1, wherein the level sensing probe is mountable and operable at an angle of about 14 degrees to about 16 degrees, relative to vessel wall.

12. The level detector of claim 1, wherein the sleeve and the level sensing probe extend from the wall towards a bottom portion of the vessel.

13. The level detector of claim 1, wherein the sleeve comprises a mounting portion secured to the wall and a measuring portion removably connected to the mounting portion inside the vessel, the mounting portion being a metallic material and the measuring portion being configured to allow slurry, aerated slurry and foam to come into contact with the level sensing probe.

14. The level detector of claim 13, wherein the measuring portion is manufactured from plastic or other non-metallic material.

15. The level detector of claim 13, wherein the measuring portion includes a plurality of passages extending therethrough.

16. The level detector of claim 1, wherein the comparator module includes an algorithm configured to generate a foam and aerated slurry level measurement by subtracting a liquid level measurement generated by the liquid level sensor, from another level measurement generated by the level sensing probe.

17. The level detector of claim 1, wherein the level sensing probe is spaced away from the inside surface of the sleeve and is positioned substantially concentric within the bore.

18. The level detector of claim 1, wherein the level sensing probe is a guided wave radar probe.

19. A method for detecting foam and aerated slurry in a vessel comprising:
   using a level sensing probe installed into a bore defined by an inside surface of a sleeve mounted to a vessel to extend through a wall defined by the vessel into an interior area of the vessel with the sleeve mounted at an angle of less than forty-five degrees relative to the wall defined by the vessel, to measure liquid, foam and aerated slurry level;
   using a liquid level sensor mounted to the vessel and extended through the wall into the interior area of the vessel, to measure liquid level; and
   using a comparator module in communication with the liquid level sensor and the level sensing probe to determine a foam and aerated slurry level by subtracting a liquid level measurement generated by the liquid level sensor, from another level measurement generated by the level sensing probe.

* * * * *